United States Patent [19]

Sabhlok et al.

[11] Patent Number: 4,940,591

[45] Date of Patent: Jul. 10, 1990

[54] MICROWAVABLE STUFFING MIX

[75] Inventors: Jatinder P. Sabhlok, Lawrenceville; William J. Horan, Mt. Holly; Donna K. Carlton, Chester, all of N.J.

[73] Assignee: Kraft General Foods, Inc., Glenview, Ill.

[21] Appl. No.: 326,718

[22] Filed: Mar. 21, 1989

[51] Int. Cl.$^5$ .................. A23B 4/10; A21D 13/00
[52] U.S. Cl. ........................... 426/94; 426/128; 426/291; 426/302; 426/549
[58] Field of Search ............ 426/291, 293, 302, 303, 426/304, 307, 549, 94, 128

[56] References Cited

U.S. PATENT DOCUMENTS

| | | | |
|---|---|---|---|
| 3,870,803 | 3/1975 | Siems et al. ..................... | 426/128 |
| 3,870,806 | 3/1975 | Capossela ........................ | 426/152 |
| 4,207,346 | 6/1980 | Wauters et al. ................. | 426/19 |
| 4,530,848 | 7/1985 | Bannon et al. .................. | 426/293 |
| 4,767,636 | 8/1988 | Ramos et al. ................... | 426/291 |
| 4,769,247 | 9/1988 | Rothenberg et al. ............ | 426/291 |

*Primary Examiner*—Donald E. Czaja
*Assistant Examiner*—Helen Pratt
*Attorney, Agent, or Firm*—Thomas R. Savoie; D. J. Donovan

[57] ABSTRACT

A dry instant stuffing mix, suitable for quick preparation using a microwave oven, contains uncoated, coarse bread crumbs (plus No. 2.5 Tyler Screen), uncoated, fine bread crumbs (minus No. 14 U.S. Standard Sieve) and an intermediate or medium fraction which is coated with a surface coating comprised of oil and powdered seasonings. The weight ratio of coarse:fine:medium crumbs is 1:0.08–1.3:2.8–4.0.

8 Claims, No Drawings

MICROWAVABLE STUFFING MIX

BACKGROUND OF THE INVENTION

The invention relates to the production of an instant stuffing mix which can be quickly prepared using a one-step recipe and a microwave oven.

At present, most instant stuffing mixes are sold to the consumer as a two-component or packet product. One packet contains bread crumbs and the other packet contains dried vegetables and seasonings. For the preparation of these stuffing products by the consumer, the vegetables and seasoning mix is combined in a saucepan with water and butter or margarine, heated to a boil on a stovetop and then simmered for several minutes. Thereafter, the bread crumbs are added to and stirred with the heated liquid in order to moisten the crumbs. The moistened crumb mixture is then covered, removed from the heat source, allowed to stand for several minutes and then fluffed with a fork and served.

It is also possible to prepare these two-component stuffing mixes using a microwave oven. According to one suggested microwave recipe, the contents of the vegetable and seasoning packet are combined with hot water and butter or margarine in a microwaveable serving dish. Thereafter, the bread crumbs are added and the dish is covered and heated in a microwave oven for about five minutes. The stuffing is then removed from the microwave, fluffed and served.

There also exist instant stuffing products consisting of a unitary mix which permit consumers to remove any desired amount of material from a bulk quantity of the mix and then prepare the desired quantity of stuffing. One such mix is described in U.S. Pat. No. 4,530,848 to Bannon et al. wherein selected sized bread crumbs - namely, passing through a No. 2.5 Tyler mesh screen (having a screen opening of 8 mm) and being retained on a No. 14 U.S. Standard Sieve (having a screen opening of 1.41 mm) - are coated with a vegetable oil and then contacted with a vegetable/spice powder in order to uniformly adhere the powder to the crumb surfaces. These coated crumbs, possibly mixed with comparably sized pieces of an inlay material, such as freeze-dried celery, form a non-segregating instant stuffing mix which can be removed from the package and utilized in any desired amount. Typical stovetop preparation would be to bring water and butter or margarine to a boil in a medium saucepan and to then stir in the instant stuffing mix. The saucepan is then covered, removed from the heat source and left to stand for five minutes to allow for thorough hydration of the crumbs. The stuffing would then be fluffed with a fork and served.

It is also possible to prepare these unitary mixes using a microwave oven as the heat source. Typical preparation would be to bring water and butter or margarine to a boil using high power and a non-metal serving dish and to then proceed in same manner as with stovetop preparation.

Although these prior instant stuffing mixes have eliminated much of the time and effort required to prepare stuffing, as compared to traditional recipes for making home-made stuffing, it is desirable to still further simplify and shorten instant stuffing recipes.

SUMMARY OF THE INVENTION

This invention relates to an instant stuffing mix which can be prepared by quickly mixing with water and cooked in a microwave oven for about three minutes. The product is produced by separating bread crumbs into course, medium and fine particle-size fractions. As used in this invention, the coarse fraction consists of bread crumbs which are retained on a No. 2.5 Tyler mesh screen (8 mm openings); the fine fraction consists of bread crumbs which pass through a No. 14 U.S. Standard Sieve (1.41 mm openings); and the medium fraction consists of bread crumbs which pass through a No. 2.5 Tyler screen and is retained on a No. 14 U.S. Standard Sieve.

According to this invention, the medium bread crumb fraction may be sprayed with vegetable oil at a level of about 5 to 25% by weight of this crumb fraction and then uniformly coated with a powdered seasoning blend of spices, vegetables, flavorants and the like at a level of about 5 to 15% by weight of this crumb fraction. Alternatively, the medium crumb fraction and the powdered seasoning blend may be mixed and the oil then sprayed onto an agitated bed of the mixture. This coated crumb fraction is then combined with an uncoated fine crumb fraction and an uncoated coarse crumb fraction.

The weight ratio for the uncoated crumb fractions of coarse to fine to medium is 1:0.08–1.3:2.8–4.0. The microwave stuffing produced, using the product of this invention, is comparable in texture and flavor to instant stuffing prepared by stove top preparation of a two-component product using a six-minute simmer step and a five-minute hydration step.

DESCRIPTION OF THE INVENTION

The stuffing mix product of this invention is added to a microwaveable dish, moistened with a measured amount of tap water, cooked, while uncovered, in a microwave oven for only three minutes, and then fluffed with a fork and served. Of course, it is also possible to consume this stuffing directly from the microwaveable dish. Optionally, pieces of butter or margarine can be added on top of the moistened stuffing mix prior to microwaving.

The stuffing mix of this invention may be packaged with a disposable, microwavable container in which the food is microwaved and from which the food is served. In this manner the consumer need only supply a measured amount of water and a fork thus reducing clean-up to a minimum. The stuffing mix may be packaged in the microwaveable dish or in a flexible pouch-type package which may be packaged in a carton together with a microwaveable dish. In either event, the stuffing mix should be sealed in moisture-proof and oxygen-resistant packaging in order to provide shelf-life stability to the product.

A suitable process for preparing the stuffing mix of the invention is to initially separate bread crumbs into the three aforementioned fractions using a No. 2.5 Tyler mesh screen and a No. 14 U.S. Standard Sieve. Preferably, the bread crumbs are high density bread crumbs having been obtained from a baked bread which has a density of from 17 to 36, preferably 23 to 31, pounds per cubic foot. The preparation of such bread and the crumb therefrom is fully described in U.S. Pat. No. 4,207,346 to Wauters et al. which is hereby incorporated by reference. As noted in the Wauters, et al. patent, the bulk density of unfractionated crumbs is about 12 to 22, preferably 15 to 20, pounds per cubic foot.

The medium sized crumbs (minus 2.5 Tyler mesh, plus 14 U.S. mesh) may be spread onto a vibrating conveyor belt, passed through a coating reel, or the like, where a vegetable oil, preferably a partially hydrogenated vegetable oil, such as soybean and/or, cottonseed oil, is sprayed onto the crumbs. Typically, the oil will be sprayed through a plurality of spray nozzles so that an essentially uniform oil coating is produced on all of the bread crumbs. The oil will be coated onto these crumbs at a level of from 5 to 25%, preferably 6 to 16%, by weight of the crumb fraction. The oil coating serves to retard the hydration of these medium-sized crumbs and this procedure has been found to be necessary so that when these oil-coated crumbs are subsequently combined, in specified amounts, with a fine and a coarse uncoated crumb fraction, the prepared stuffing exhibits a desirable texture which is neither pasty or gummy.

The oil coating also permits a ground or powdered seasoning blend of flavor and spices to evenly adhere to the medium crumb fraction. As the medium crumb fraction is the major crumb fraction in the mix, the cooked stuffing will have balanced flavor throughout the product. Additionally, in the event that any of the added spices or flavor materials are highly absorbent of microwave energy, uniform distribution of spices and flavor throughout the stuffing will eliminate hot spots being created during the cooking cycle.

The seasoning blend may be uniformly distributed onto the oil-coated crumbs in any known manner. U.S. Pat. No. 4,530,848, which is hereby incorporated by reference, discloses several suitable techniques. Typical ingredients for the seasoning blend include materials such as salt, pepper, sugar, onion powder, monosodium glutamate, spices, powdered cheese, flavor, color, preservatives and the like. The seasoning blend is adhered to the surface of the oil-coated, medium crumb fraction at a level of from about 5 to 40%, preferably 5 to 30%, by weight of the uncoated, medium-sized crumb fraction.

The oil-coated and seasoned crumbs are combined with the fine (minus 14 U.S. mesh) and coarse (plus 2.5 Tyler 3 mesh) fractions at a crumb ratio (by weight) of coarse to fine to medium of 1:0.08-1.3:2.8-4.0, preferably 1:1.0-1.2:3.1-3.7. The stuffing mix will be comprised on a weight-basis of from 75 to 85% bread crumbs, 3 to 15% vegetable oil, 5 to 20% seasoning and 0 to 20% inlay materials. Typically, the crumbs will consist of 16-20% coarse fraction, 18-22% fine fraction and 60-64% medium fraction.

It will also be possible to first mix the crumbs and seasoning blend together and then apply a uniform oil spray. A coating reel would be a suitable piece of equipment in which to perform the oil-spraying step.

The inlay material may be various dry, rehydratable particles, such as diced or minced vegetables (e.g., carrots, celery, broccoli, mushrooms, onions, etc.), cheese, hydrolyzed vegetable protein, parsley flakes and the like. When incorporated into the stuffing mix, inlay amounts of from 2 to 20% by weight are typical. The inlay materials and seasonings may be selected and combined in order to produce numerous varieties of flavored, instant stuffing mixes all of which are within the scope of this invention. Levels for common ingredients are from 1 to 5% by weight of the mix of rapidly-hydratable dried vegetable particles and from 0.2 to 1.5% by weight of the mix of dehydrated vegetable flakes. The inlay material may be mixed with the coated crumb fraction and this mixture than combined with the coarse and fine crumb fractions. Alternatively, the crumb fractions could be combined and thereafter the inlay materials can be blended with the crumbs.

This invention is further described, but not limited, by the following examples and comparisons.

EXAMPLE 1

High density bread crumbs are produced in accordance with the aforementioned Wauters et al. patent. These crumbs are fractionated into fine, medium and coarse components using a No. 2.5 Tyler screen and a No. 14 U.S. Standard Sieve. The medium crumb fraction is conveyed onto a vibrating chute which extends into a rotating coating reel. A chicken-flavored spice mix is combined with the crumbs on the chute and both crumbs and spices are delivered into the coating reel.

A vegetable oil, which is a partially hydrogenated soybean and/or cottonseed oil, is sprayed through nozzles onto the crumb-spice mixture as it rotates in the reel. Approximately two feet from the outlet of the reel, dry vegetable pieces (dried onions and parsley flakes) are fed into the reel and mixed with the crumb-spice-oil blend. This mixture is then fed to a filler. The filler is also fed with streams of the coarse and the fine crumb fractions. Each feeder delivers the prescribed amount of each fraction to a packaging station.

Employing this process a chicken-flavored stuffing mix was packaged with a composition as follows:

| | |
|---|---|
| Bread Crumbs | 83.8 |
| (62% medium, 20% fine, 18% coarse) | |
| Vegetable Oil | 8.3 |
| Spice Blend | 5.3 |
| Dried Vegetables | 2.6 |

EXAMPLE 2

Using 182 grams of the stuffing mix of Example 1, a prepared stuffing was made. The mix was added into a microwavable pan. One and two-thirds cups (395 ml) of warm tap water was stirred in until all of the crumbs were moistened. The pan was then promptly placed, uncovered, in a microwave oven where it was cooked at high power for three minutes. The pan was then removed from the oven and the stuffing fluffed with a fork. The stuffing was judged to have a taste and texture equivalent to stuffing mixes wherein crumbs and seasonings were packaged separately and wherein the stuffing was prepared with a stovetop recipe using a six-minute simmer step and a five-minute stand.

EXAMPLE 3

A taste comparison test was done to further compare the stuffing mix of this invention, as in Example 2, to the stuffing mix of U.S Pat. No. 4,530,848, both using a three-minute microwave recipe, and to a two-step, stove top-prepared stuffing mix (Stove Top ® a product of General Foods Corporation, White Plains, N.Y.). In all three instances a chicken-flavored stuffing mix was utilized.

The Stove Top ® stuffing was prepared by combining the contents of a vegetable and seasoning packet with 1.75 cups (415 ml) of water in a medium saucepan. One quarter cup (59 ml) of butter was also added to the pan. The pan was then heated on a stove to bring the contents to a boil. Heat was then reduced; the pan was covered; and the contents simmered for six minutes. Thereafter, the crumbs were added into the pan and stirred until moistened. The pan was again covered and then removed from the heat and allowed to stand for five minutes. The contents of the pan were then fluffed with a fork and evaluated organoleptically for texture.

A non-segregating, one-step stuffing mix was prepared in accordance with U.S. Pat. No. 4,530,848. Accordingly, a medium-sized crumb fraction (minus No. 2.5 Tyler screen and plus No. 14 U.S. Standard Sieve) was spray coated with hydrogenated vegetable oil (about 7% by weight of the crumbs), and the coated crumbs were blended with a chicken-flavored spice blend (about 10% by weight of the crumbs), dried vegetable pieces (about 1.25% by weight of the crumbs) and parsley flakes (about 0.6% by weight of the crumbs). Two cups of this dry stuffing mix were combined with 1⅜ cups of warm tap water, stirred to moisten the crumbs and then cooked for three minutes in a microwave at high power. The stuffing was removed from the microwave, fluffed and served. The stuffing had an acceptable flavor; however, the texture was somewhat pasty and considerably different in both mouthfeel and appearance from the texture of the stove top prepared stuffing and the prepared stuffing of Example 2. As noted in Example 2, the texture and mouthfeel of the stuffing of this invention is comparable to the stove-top prepared stuffing.

Having thus described the invention, what is claimed is:

1. A dry microwavable instant stuffing mix which can be prepared by mixing with water and cooking in a microwave oven for about three minutes, comprised of an uncoated, coarse bread crumb fraction, an uncoated, fine bread crumb fraction and a medium bread crumb fraction which has been surface-coated with both a vegetable oil at a level of from about 5 to 25% by weight of the medium crumb fraction and a powdered seasoning blend at a level of from about 5 to 15% by weight of the medium crumb fraction, wherein the coarse fraction is retained on a No. 2.5 Tyler screen, the fine fraction passes through a No. 14 U.S. Standard Sieve and the medium fraction passes through a No. 2.5 Tyler screen and is retained on a No 14 U.S. Standard Sieve and wherein the weight ratio of coarse:fine:medium crumb fractions is 1:0.08–1.3:2.8–4.0.

2. The dry mix of claim 1 which further contains particles of rapidly-hydratable dried vegetables at a level of from 1 to 5% by weight of the mix.

3. The dry mix of claim 2 which contains from 0.2 to 1.5% by weight of dehydrated vegetable flakes.

4. The dry mix of claim 3 which contains dehydrated parsley flakes.

5. The dry mix of claim 1 wherein the crumbs consist of 16–20% coarse fraction, 18–22% fine fraction and 60–64% medium fraction.

6. The dry mix of claim 1 wherein the bread crumbs are obtained by subdividing a fully-baked bread which has a density within the range of about 17 to 36 lbs./cubic foot.

7. The dry mix of claim 1 wherein the oil level is from 6 to 16% by weight of the medium crumb fraction.

8. The dry mix of claim 1 wherein the weight ratio of the coarse:fine:medium crumb fraction is 1:1.0–1.2:3.1–3.7.

* * * * *